United States Patent
Srivastava et al.

(10) Patent No.: US 11,485,816 B2
(45) Date of Patent: Nov. 1, 2022

(54) POLYURETHANE FOAMS FOR COMFORT APPLICATIONS

(71) Applicant: Dow Global Technologies LLC, Midland, MI (US)

(72) Inventors: Yasmin Srivastava, Sugarland, TX (US); William Koonce, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 338 days.

(21) Appl. No.: 16/772,219

(22) PCT Filed: Dec. 13, 2018

(86) PCT No.: PCT/US2018/065394
§ 371 (c)(1),
(2) Date: Jun. 12, 2020

(87) PCT Pub. No.: WO2019/125896
PCT Pub. Date: Jun. 27, 2019

(65) Prior Publication Data
US 2021/0087322 A1   Mar. 25, 2021

Related U.S. Application Data

(60) Provisional application No. 62/608,554, filed on Dec. 20, 2017.

(51) Int. Cl.
*C08G 18/12* (2006.01)
*C08G 18/76* (2006.01)
*C08G 18/30* (2006.01)
*C08G 18/48* (2006.01)
*C08G 101/00* (2006.01)

(52) U.S. Cl.
CPC .......... *C08G 18/12* (2013.01); *C08G 18/302* (2013.01); *C08G 18/4825* (2013.01); *C08G 18/4837* (2013.01); *C08G 18/7671* (2013.01); *C08G 2101/00* (2013.01); *C08G 2110/0008* (2021.01); *C08G 2110/0058* (2021.01)

(58) Field of Classification Search
CPC .. C08G 18/12; C08G 18/302; C08G 18/4825; C08G 18/4837; C08G 18/7671; C08G 2110/0008; C08G 2110/0058; C08G 2101/00
See application file for complete search history.

(56) References Cited

U.S. PATENT DOCUMENTS

| | | | |
|---|---|---|---|
| 4,365,025 A | 12/1982 | Murch | |
| 5,312,847 A * | 5/1994 | de Vos | C08J 9/0061 521/137 |
| 5,489,620 A * | 2/1996 | Bleys | C08G 18/797 521/173 |
| 6,037,382 A * | 3/2000 | Huygens | C08G 18/409 521/914 |
| 6,077,456 A * | 6/2000 | Narayan | C08G 18/797 528/65 |
| 8,753,612 B2 | 6/2014 | De Vreese | |

FOREIGN PATENT DOCUMENTS

| | | | |
|---|---|---|---|
| EP | 2078477 A | 7/2009 | |
| WO | 2016/069537 A | 5/2016 | |
| WO | WO-2016069437 A1 * | 5/2016 | ............. A47C 27/14 |

\* cited by examiner

*Primary Examiner* — Michael L Leonard

(57) ABSTRACT

Flexible polyurethane foams are made by reacting a hydrophilic quasi-prepolymer, water and a polymer polyol in the presence of a silicone surfactant and an ethylene oxide/higher alkylene oxide block copolymer. The foams exhibit desirably low densities and compression sets, and have good thermal and moisture-wicking properties. The foams are useful in bedding and other comfort applications in which they are exposed to body heat and bear at least a portion of the weight of the user. The thermal and moisture wicking properties contribute to perceived comfort for the user.

18 Claims, No Drawings

POLYURETHANE FOAMS FOR COMFORT APPLICATIONS

This invention relates to flexible polyurethane foams that are useful in comfort applications such as pillows, mattresses, mattress toppers and seat cushions.

Polyurethane foams are used in very large quantities to make cushioning materials, in particular for bedding and seating. A problem with these foams is that they do not conduct heat very effectively. Thus, heat given off by a user is trapped by the foam in the regions closely adjacent to the user's body. This results in a localized temperature rise that the user often perceives as being uncomfortable.

One approach to solving this problem is to render the foam more hydrophilic. The polyurethane foams most commonly used in these applications are somewhat hydrophobic materials that do not absorb much moisture. Water vapor evaporating from a user becomes trapped next to user's body. This increases the local relative humidity and contributes to the localized capture of heat and perceived discomfort. A hydrophilic foam can absorb at least some of this water vapor and conduct it through the polymer network and away from the user. This dissipates heat and reduces the relative humidity adjacent to the user's body, thereby improving the perceived comfort.

In WO 2016/069437 are described hydrophilic polyurethane foams for comfort applications. They are made by reacting 20 to 80% by weight of an aqueous component with correspondingly 80 to 20% by weight of a hydrophilic isocyanate-terminated prepolymer. The resulting foams have the benefits of high specific heat, high thermal conductivity and high water uptake, all of which contribute to the dissipation of heat and greater perceived comfort.

Unfortunately, the density of the polyurethane foam example of WO 2016/069437 is higher than is desired. A density of 5 pounds per cubic foot (80 kg/m$^3$) or lower is desirable. In addition, low thermal conductivity is wanted.

Although lower densities can be obtained in various ways, the lower density foams are plagued by having higher compression sets than are wanted. Compression set is a permanent loss of foam height after the foam is compressed. High compression sets cause sagging, the formation of depressions, loss of foam height and shape and other problems. Hydrophilic polyurethane foams are in general very susceptible to having high compression sets.

What is desired is a polyurethane foam suitable for comfort applications such as bedding and seat cushioning. The foam should be able to dissipate heat and absorb moisture, yet should have a low foam density while also exhibiting a low compression set.

This invention in one aspect is a flexible polyurethane foam comprising a reaction product of a reaction mixture that comprises a) an isocyanate-functional quasi-prepolymer, which isocyanate-functional quasi-prepolymer is a reaction product of at least one hydroxyl-terminated polymer of ethylene oxide with an excess of an organic polyisocyanate that includes at least 80 weight-% diphenylmethane diisocyanate, of which diphenylmethane diisocyanate at least 50 weight-% is 4,4'-diphenylmethane diisocyanate, wherein the isocyanate-functional quasi-prepolymer has an isocyanate content of 5 to 15% by weight and contains 30 to 70 weight percent of oxyethylene units, based on the weight of the isocyanate-functional quasi-prepolymer, b) water, c) at least one polymer polyol comprising polymer particles dispersed in at least one base polyol, d) at least one silicone surfactant and e) at least one ethylene oxide/higher alkylene oxide block copolymer, wherein i) the quasi-prepolymer constitutes 50 to 75% of the combined weights of components a-e;

ii) water constitutes 15-41% of the combined weights of components a-e;

iii) the at least one polymer polyol constitutes 8 to 20% of the combined weights of components a-e and the polymer particles constitute 0.5 to 8% of the combined weights of components a-e;

iv) the at least one silicone surfactant constitutes 0.5 to 3% of the combined weights of components a-e and v) the at least one ethylene oxide/higher alkylene oxide block copolymer constitutes 0.5 to 3% of the combined weights of components a-e.

The foam of the invention possesses an excellent combination of properties, including good conduction of heat and moisture, low density and low compression set. This set of properties make the foam particularly useful for bedding, seating and other "comfort" applications, in which the foam becomes exposed to the body heat of and/or water vapor evaporating from the body of a human user. The foam or an article containing the foam may in such applications support at least a portion of the weight of a human user.

The invention is also a method of making a flexible polyurethane foam, comprising A. forming a reaction mixture by mixing at least the following components a-e:

a) an isocyanate-functional quasi-prepolymer, which isocyanate-functional quasi-prepolymer is a reaction product of at least one hydroxyl-terminated polymer of ethylene oxide with an excess of an organic polyisocyanate that includes at least 80 weight-% diphenylmethane diisocyanate, of which diphenylmethane diisocyanate at least 50 weight-% is 4,4'-diphenylmethane diisocyanate, wherein the isocyanate-functional quasi-prepolymer has an isocyanate content of 5 to 15% by weight and contains 30 to 70 weight percent of oxyethylene units, based on the weight of the isocyanate-functional quasi-prepolymer, b) water, c) at least one polymer polyol comprising polymer particles dispersed in at least one base polyol, d) at least one silicone surfactant and e) at least one ethylene oxide/higher alkylene oxide block copolymer, and B. subjecting the reaction mixture formed in step A to conditions at which the isocyanate-functional quasi-prepolymer and one or more of components b-e react to form the flexible polyurethane foam, wherein i) the quasi-prepolymer constitutes 50 to 75% of the combined weights of components a-e;

ii) water constitutes 15-41% of the combined weights of components a-e;

iii) the at least one polymer polyol constitutes 8 to 20% of the combined weights of components a-e and the polymer particles constitute 0.5 to 8% of the combined weights of components a-e;

iv) the at least one silicone surfactant constitutes 0.5 to 3% of the combined weights of components a-e; and v) the at least one ethylene oxide/higher alkylene oxide block copolymer constitutes 0.5 to 3% of the combined weights of components a-e.

The quasi-prepolymer is a reaction product of an organic polyisocyanate that includes diphenylmethane diisocyanate (MDI), and a polyether that contains oxyethylene groups. By "quasi-prepolymer", it is meant that the reaction product is a mixture of free (unreacted) starting organic polyisocyanate and isocyanate-terminated prepolymer molecules formed in the reaction of the polyether and organic polyisocyanate molecules. The amount of free organic polyisocyanate may constitute, for example, at least 5, at least 10, at least 15 or at least 20 percent of the total weight of the quasi-prepolymer, to as much as 50, as much as 35 or as much as 30 or as much as 25 percent thereof.

In some embodiments, the organic polyisocyanate may have a number average isocyanate functionality of 1.95 to 2.15, preferably 1.95 to 2.05, and an isocyanate equivalent weight of 123 to 128, preferably 124 to 126.

MDI constitutes at least 80% of the weight of the organic polyisocyanate used to make the quasi-prepolymer. MDI may constitute at least 85%, at least 90% or at least 95% thereof, and may constitute up to 100% or up to 99% thereof. At least 50% of the weight of the MDI is the 4,4'-isomer. In some embodiments, at least 60%, at least 70%, at least 75% or at least 80% of the weight of the MDI is the 4,4'-isomer. The 4,4'-isomer may constitute up to 100%, up to 99%, up to 98% of the weight of the MDI. The remaining portion of the MDI (if any) is made up of the 2,4- and/or 2,2'-isomers. The 2,2'-isomer, if present at all, typically constitutes no more than 2% of the weight of the MDI. The starting organic polyisocyanate used to make the quasi-prepolymer may contain up to 20 weight-%, preferably up to 10 weight-%, up to 5 weight-% or up to 2 weight-%, of other isocyanate-containing compounds, although such other compounds may be absent. Such other organic polyisocyanates preferably have molecular weights of 1000 or below, preferably 500 or below, and preferably contain 2 to 4 isocyanate groups per molecule. Examples of other organic isocyanates include polyphenylene polymethylene polyisocyanates having three or more rings, toluene diisocyanate, one or more aliphatic polyisocyanates, and the like, as well as isocyanate-containing compounds that contain, for example, biuret, allophonate, urea, urethane, isocyanurate and/or carbodiimide linkages.

The most preferred organic polyisocyanate used to make the quasi-prepolymer is an MDI product that contains at least 60 weight-%, at least 70 weight-% or at least 80 weight-% 4,4'-MDI, up to 40 weight-%, preferably up to 30 weight-% or up to 20 weight-% 2,4'-MDI and 0 to 2 weight percent of other isocyanate compounds.

The polyether used to make the quasi-prepolymer contains oxyethylene groups. It is conveniently a hydroxyl-terminated homopolymer of ethylene oxide or a hydroxyl-terminated random or block copolymer of ethylene oxide and 1,2-propylene oxide. The polyether may contain, for example, at least 50% or at least 60% by weight of oxyethylene groups and as much as 100% by weight oxyethylene groups. A polyether of particular interest is a poly(ethylene oxide) homopolymer. Another is a random or block copolymer of ethylene oxide and 1,2-propylene oxide which contains 50 to 95%, preferably 60 to 95%, of oxyethylene groups and correspondingly 5 to 50%, preferably 5 to 40%, of 2-methyloxyethylene groups.

The polyether may nominally contain, for example, a number average of 2 to 4 hydroxyl groups per molecule. A preferred nominal average hydroxyl functionality is 2 to 3 and a more preferred nominal average hydroxyl functionality is 2 to 2.5 or 2 to 2.25. Nominal functionality refers to the number of oxyalkylatable groups on the initiator compound used in producing the polyether(s). A primary amino group is considered to contain 2 oxyalkylatable sites for purposes of this invention.

The equivalent weight of the polyether preferably is at least 300 or at least 450, and may be, for example, up to 6000, up to 3000 or up to 2000. An especially preferred equivalent weight range is 500 to 1800.

A mixture of two or more polyethers as described above may be used to make the quasi-prepolymer.

A branching agent and/or chain extender is optionally present when the quasi-prepolymer is formed. Such a branching agent or chain extender may have a hydroxyl equivalent weight of up to 250 or up to 125, and may have at least 3 hydroxyl groups per molecule in the case of a branching agent and exactly two hydroxyl groups per molecule in the case of a chain extender. If these are present at all, they are suitably present in an amount of up to 5, preferably up to 2, parts by weight per 100 parts by weight of the polyether(s).

The equivalent weight and oxyethylene content of the polyether(s) are selected together with the amount of organic polyisocyanate (and branching agents and chain extenders, if present) to produce a quasi-prepolymer having an isocyanate content of 5 to 15% by weight of the quasi-prepolymer and an oxyethylene content of 30 to 75% by weight of the quasi-prepolymer. The isocyanate content may be at least 6% or at least 7% and may be, for example, up to 12%, up to 10% or up to 9%. The oxyethylene content may be at least 40%, at least 50% or at least 55% and up to 70% or up to 65%.

The isocyanate content of the quasi-prepolymer may be determined using well-known titration methods.

The oxyethylene content of the quasi-prepolymer is conveniently calculated from the oxyethylene content of the polyether(s) and the weights of the reactive starting materials, i.e., the weights of polyether(s) and organic polyisocyanate used in making the quasi-prepolymer, as well as the weights of any branching agents and/or chain extenders as may be used.

The quasi-prepolymer is conveniently prepared by mixing the starting organic polyisocyanate and polyether(s) and subjecting the mixture to conditions under which a portion of the isocyanate groups react with hydroxyl groups of the polyether(s) to form urethane linkages. This reaction is conveniently performed at an elevated temperature (such as from 60 to 180° C.) and preferably under an inert atmosphere such as nitrogen, helium or argon. The reaction is generally continued until the prepolymer attains a constant isocyanate content, indicating the consumption of essentially all the hydroxyl groups of the polyether.

The quasi-prepolymer preferably is made in the substantial absence of a urethane catalyst, i.e. a catalyst for the reaction of an isocyanate group with a hydroxyl group to form a urethane. In particular, the reaction mixture for forming the quasi-prepolymer preferably contains no more than 1 part per million by weight of metals and no more than 100 parts per million of amine compounds. The resulting quasi-prepolymer according contains similarly small amounts of such materials (if any at all). The polyether(s) preferably are not amine-initiated and do not otherwise contain amine groups that exhibit activity as urethane catalysts.

The quasi-prepolymer constitutes 50 to 75% of the combined weights of components a-e. It may constitute at least 55% or at least 58% thereof and may constitute up to 70% or up to 65% thereof.

Water constitutes 15-41% of the combined weights of components a-e. Water may constitute at least 17%, at least 19% or at least 20% thereof and may constitute up to 35% or up to 30% thereof.

The polymer polyol is a dispersion of polymer particles in a liquid base polyol, the base polyol forming a continuous phase. Some or all of the polymer particles may be grafted to the base polyol. The polymer polyol may also include one or more stabilizers, to which the some or all of the polymer particles may be grafted.

The base polyol is one or more polyethers that has a hydroxyl equivalent weight of at least 250. The hydroxyl equivalent weight may be at least 300, at least 350, at least 500, at least 800, at least 1000 or at least 1200 and may be, for example, up to 2500, up to 2000 or up to 1800. The base polyol may be a polymer or copolymer of propylene oxide. Homopolymers of propylene oxide and random and/or block copolymers of 50 to 99 weight-% propylene oxide and 1 to 50% ethylene oxide are particularly useful base polyols.

The base polyol may have a nominal functionality of 2 to 6, especially 2 to 4 and most preferably 2 to 3. The "nominal functionality" of the base polyol refers to the average number of oxyalkylatable groups per molecule on the initiator compound(s) used to make the base polyols. Actual functionalities may be somewhat lower than nominal functionalities in some instances.

An especially preferred type of base polyol is made by homopolymerizing propylene oxide or randomly copolymerizing 75-99.9 weight percent propylene oxide and correspondingly 0.1 to 25 weight percent ethylene oxide onto a di- or trifunctional initiator, and optionally capping the resulting polyether with up to 30% by weight (based on total product weight) ethylene oxide to form a base polyol having mainly primary hydroxyl groups.

The dispersed polymer particles may constitute, for example, at least 1, at least 5 or at least 10 percent of the total weight of the polymer polyol and may constitute, for example, up to 60 percent, up to 50%, up to 40%, up to 30% or up to 20% of the total weight thereof.

The dispersed polymer particles in some embodiments have particle sizes from 100 nm to 25 more typically from 250 nm to 10 µm. Preferably, at least 90 volume-% of the dispersed polymer particles have sizes within these ranges. The particle sizes are taken as diameters of spheres having an equivalent volume. Particle size measurements can be obtained by laser diffraction methods, using equipment such as a Beckman-Coulter LX 13320 laser diffraction particle size analyzer.

The dispersed polymer particles may be, for example, polyurea, polyurethane, and/or polyhydrazide, or a polymer of one or more vinyl monomers. Useful vinyl monomers include, for example, various polyolefins (such as polymers and copolymers of ethylene), various polyesters, various polyamides, various polycarbonates, various polymers and copolymers of acrylic and/or methacrylic esters, a homopolymer or copolymer of styrene, a homopolymer or copolymer of acrylonitrile and the like. In some embodiments, the dispersed particles are styrene-acrylonitrile copolymer particles.

At least a portion of the dispersed polymer particles preferably are grafted onto at least a portion of the base polyol molecules that form the continuous phase.

Dispersions of polyurea particles can be prepared by reacting a primary or secondary amine with a polyisocyanate in the presence of the base polyol. Methods for producing polyurea dispersions are described, for example, in WO 2012/154831.

Dispersions of polyurethane particles can be prepared by reacting a low equivalent weight polyol or aminoalcohol with a polyisocyanate in the presence of the base polyol. Methods for producing such dispersions are described, for example, in U.S. Pat. No. 4,305,857, WO 94/20558, WO 2012/154820.

Dispersions of polymerized vinyl monomers can be prepared by the in situ polymerization of such monomers in the base polyol. Such methods are described, for example, U.S. Pat. Nos. 4,513,124, 4,588,830, 4,640,935 and 5,854,386. Alternatively, dispersions of this type can be formed in a melt dispersion process, in which a previously-formed vinyl polymer is melted and dispersed into the base polyol. Methods of this type are described in U.S. Pat. No. 6,613,827 and WO 2009/155427.

The polymer polyol(s) constitute at least 8 percent of the combined weights of components a-e. In some embodiments the polymer polyol(s) constitute at least 9 percent thereof. The polymer polyol(s) constitute up to 20% of the combined weights of components a-e and may constitute up to 18%, up to 15% or up to 12% thereof.

The dispersed polymer particles constitute 0.5 to 8% of the combined weights of components a-e. The dispersed polymer particles may constitute at least 1%, at least 1.25% or at least 1.5% thereof and up to 6%, up to 4% up to 3% thereof.

The polymer polyol preferably contains no more than 5 parts per million or no more than 1 part per million by weight of metals and no more than 100 parts per million of amine compounds. The base polyol(s) preferably are not amine-initiated and do not otherwise contain amine groups that exhibit activity as urethane catalysts.

Useful silicone surfactants are self-dispersible and/or soluble in water. Included among the useful silicone surfactants are block copolymers having at least one polysiloxane block and at least one polyether block. Such block copolymers may be, for example, A-B or B-A-B type copolymers wherein A represents the polysiloxane block and each B represents a polyether block. Such block copolymer may be a pendant graft-type structure in which multiple polyether blocks depend from a polysiloxane block. Each polyether block is preferably a homopolymer or copolymer of ethylene oxide. A copolymer of ethylene oxide may be a copolymer of ethylene oxide and propylene oxide.

The silicone surfactant may contain, for example, 20 to 80% by weight polysiloxane, 20 to 75% by weight polymerized ethylene oxide and 0 to 50% by weight polymerized propylene oxide, based on the total weight of the silicone surfactant. A more preferred silicone surfactant contains 20 to 80% by weight polysiloxane, 20 to 75% by weight polymerized ethylene oxide and 0 to 20% by weight polymerized propylene oxide. A still more preferred silicone surfactant contains 25 to 50% by weight polysiloxane, 50 to 75% by weight polymerized ethylene oxide and 0 to 10% by weight polymerized propylene oxide.

Suitable silicone surfactants are commercially available and include, for example, water soluble surfactants sold by Momentive under the Silwet® product designation. This include, for example, Silwet® L-7002, L-7200, L-7230, L-7600, L-7604, L-7605 and L7657 surfactants.

The silicone surfactant(s) constitute 0.5 to 3% of the combined weights of components a-e. The silicone surfactant(s) may constitute at least 0.75% or at least 1% thereof and may constitute up to 2.5% or 2% thereof.

The block copolymer of ethylene oxide and a higher alkylene oxide contains one or more oxyethylene blocks and one or more blocks of a polymerized higher alkylene oxide. The higher alkylene oxide may be, for example, 1,2-propylene oxide, 1,2-butylene oxide or a mixture thereof. Such block copolymers may contain, for example, 40 to 90% by weight oxyethylene units and have number average molecular weights of 1500 to 12,000 (by gel permeation chromatography against polystyrene standards). Such block copolymers may have one or more hydroxyl groups, such as 1 to 4 hydroxyl groups or 2 to 4 hydroxyl groups. Examples of suitable block copolymers include those sold by The Dow Chemical Company under the Tergitol™ trade name, and those sold by BASF under the Pluronics™ trade name.

The block copolymer of ethylene oxide and a higher alkylene oxide preferably contains no more than 5 parts per million or no more than 1 part per million by weight of metals and no more than 100 parts per million of amine compounds. It preferably is not amine-initiated.

The reaction mixture may contain one or more optional ingredients in addition to components a-e as described above.

Among the suitable optional ingredients are one or more branching agents and/or chain extenders as described before in connection with the preparation of the quasi-prepolymer, but these can be omitted. If used, they preferably are present in an amount of up to 5 parts by weight or up to 2 parts by weight, per 100 parts by weight of the quasi-prepolymer.

Other suitable optional ingredients are additional isocyanate-reactive materials, different from components a-e. If present, these preferably constitute up to 5 parts by weight or up to 2 parts by weight, per 100 parts by weight of the quasi-prepolymer.

The reaction mixture also may contain various ingredients such as colorants, antioxidants, preservatives, biocides, fragrances, thickening agents (such as xanthan gum, various water-soluble cellulose ethers or polyacrylamide), mixing aids, wetting agents (when fillers are present) and the like. If present, these preferably constitute up to 10% or up to 5% of the total weight of the reaction mixture.

Components a-e together preferably constitute at least 90%, more preferably at least 95% or at least 98% of the total weight of the reaction mixture, not counting any fillers.

The reaction mixture for making the polyurethane foam preferably is essentially devoid of a curing catalyst, i.e. a catalyst for the reaction of isocyanate groups toward water and/or alcohol groups. In particular, the reaction mixture preferably contains no more than 5 parts per million, preferably no more than 1 part per million, by weight of metals and no more than 100 parts per million of amine compounds.

The reaction mixture may contain, in addition to components a-e, one or more solid components such as phase change agents, fillers and reinforcing materials. Examples of fillers include clays, diatomaceous earth, calcium carbonate, wollastonite, ground polymer particles, wood flour, cork flour, glass or other ceramic particles, and various types of natural and synthetic fibers, which fibers may be woven, knitted or entangled if desired. Such solid components may constitute up to 75 percent of the total weight of the reaction mixture.

Polyurethane foam is made by combining the ingredients to form a reaction mixture and subjecting the resulting reaction mixture to conditions at which the isocyanate-functional quasi-prepolymer and one or more of components b-e react to form the flexible polyurethane foam.

Ingredients a-e can be combined in any order, although it is preferred to add the quasi-prepolymer last or simultaneously with the other ingredients to avoid premature reaction before the rest of the ingredients can be added. Thus, for example, components b-e can be combined first, followed by adding the quasi-prepolymer. Alternatively, components a-e can all be combined at once. It is also possible to form components b-e into various subcombinations that are combined when the quasi-prepolymer is added. Optional ingredients that are isocyanate-reactive or water-soluble can be added together with the water or separately.

Curing occurs spontaneously upon mixing the water with the quasi-prepolymer, and so a broad range of conditions are suitable for performing the reaction. The curing temperature may be as low as 0° C. or as high as, for example, 100° C. Temperatures near room temperature or slightly elevated temperature are entirely suitable and generally preferred. Thus, the curing temperature may be at least 15° C. or at least 20° C. and up to 50° C., 40° C. or 35° C. The curing reaction produces carbon dioxide gas that forms cells and expands the reaction mixture as the curing takes place.

The curing step may be performed in an open container, in which the rising foam expands against the weight of the atmosphere and/or the weight of a thin film. Such a free-rise process may be performed by dispensing the reaction mixture into a trough where it rises and cures.

The curing step may instead be performed in a closed container such as a closed mold, in which expansion is constrained by the internal dimensions of the cavity to produce a foam having a size and shape corresponding to that of the mold cavity.

The amount of water in the reaction mixture is far in excess of the amount of isocyanate groups of the quasi-prepolymer. Because of this, the cured foam often contains a significant amount of moisture that may be at least partially in the form of a liquid contained in the cells of the foam. A drying step may be performed to remove some or all of this excess water.

Such a drying step can be performed, for example, by passing a dry gas through the foam, by allowing the foam to sit under a dry atmosphere, and/or by heating the foam to a temperature of, for example, 50 to 150° C. Drying can be performed until any desirable moisture content is achieved. In some embodiments, drying is performed until a constant foam weight is achieved, indicating the removal of all residual water from the foam.

Foam of the invention may have a foam density of, for example, 40 to 144 kg/m$^3$, as measured according to ASTM D3574. A significant advantage of this invention is that foam densities of 80 kg/m$^3$ and below are readily obtained. In some embodiments, the foam density is 48 to 80 kg/m$^3$ or 48 to 64 kg/m$^3$.

When dried, the foam of the invention exhibits a low compression set in addition to low foam density. Compression set is measured in accordance with ASTM D-3774:D on 5×5×2.54 cm skinless specimens. The thicknesses of the specimens are measured with a micrometer. The specimens are then put between steel plates, compressed by 90% of their original thickness and aged under compression at 70° C. for 22 hours. The specimens are then removed from the test apparatus and permitted to recover at room temperature for 30 minutes before remeasuring their thicknesses. Compression set is calculated as [100%×(original thickness−final thickness)]÷original thickness. Compression set is typically less than 40%. Compression set in preferred embodiments may be 25% or less, 20% or less, 15% or less or even 12% or less.

Foam of the invention, when dried to constant weight as described above, may exhibit a specific heat (measured as described in WO 2016/069437) of at least 1.5 J/g·° K. Its specific heat may be at least 2 J/g·° K, at least 2.1 J/g·° K, at least 2.2 J/g·° K, at least 2.5 J/g·° K or at least 2.7 J/g·° K.

Foam of the invention, when dried to constant weight as described above, may exhibit a thermal conductivity (measured as described in WO 2016/069437) of at least 0.03 W/m·° K. The thermal conductivity may be at least 0.04 W/m·° K and may be up to, for example, 0.2 W/m·° K or up to 0.1 W/m·° K.

Foam of the invention may exhibit a water uptake of 300% to 700%. Water uptake is measured on 5×5×2.54 cm skinless samples that are dried to constant weight and weighed. The samples are immersed in room temperature water for one minute, then removed, patted dry for 30 seconds and re-weighed. Water uptake is calculated as:

$$\text{Water uptake} = 100\% \times \frac{\text{Weight}_{wet, patted\ dry} - \text{Weight}_{dry}}{\text{Weight}_{dry}}$$

The foam in some embodiments exhibits a moisture wicking time of 5 seconds or less, preferably 4 seconds or less. Moisture wicking time is measured on 5×5×2.54 cm skinless samples that are dried to constant weight. 3 mL of room temperature water is slowly dropped onto the top surface of the foam sample from a pipette and the amount of time required for the foam to absorb the water is recorded as the wicking time.

The ability of the foam to dissipate heat is sometimes indicated by comparing its surface temperature to the temperature of the surrounding air. Good heat dissipation can be indicated by the foam having a lower surface temperature than the surrounding air, after being exposed to air of constant temperature for enough time to bring the foam to thermal equilibrium, such as for 24 hours. The surface temperature may be, for example, from 0.1 to 3° C. lower than the surrounding air when conditioned at room temperature for 24 hours. Surface temperature is conveniently measured with an infrared thermometer.

Foam of the invention is useful for bedding, seating and other "comfort" applications. Comfort applications include those in which during use the foam becomes exposed to the body heat of or water vapor evaporating from the body of a human user. The foam or an article containing the foam in such applications often supports at least a portion of the weight of a human user and becomes compressed during use. Examples of such comfort applications include pillows; mattress toppers, mattresses, comforters, furniture and/or automotive seating; quilting; insulated clothing and the like.

The following examples are provided to illustrate the invention, but are not intended to limit the scope thereof. All parts and percentages are by weight unless otherwise indicated.

EXAMPLES 1-2 AND COMPARATIVE SAMPLES A-F

A. Quasi-Prepolymer Formation

Quasi-Prepolymers A-C are made in the following general manner, from ingredients as indicated in Table 1. The polyol(s) are dried to a moisture content of less than 250 ppm by heating them to 100° C. overnight with stirring under nitrogen. A trace of benzoyl chloride is added to the dried polyols and stirred in. The polyisocyanate(s) are separately heated to 50° C. and combined with the polyol(s). No urethane catalyst is added to the resulting reaction mixture, which contains no more than 1 part per million by weight of metals and no more than 100 parts per million of amine compounds. The reaction mixture is heated at 75° C. under nitrogen until a constant isocyanate content is obtained. The quasi-prepolymer is then cooled to room temperature and stored under nitrogen.

The NCO content is measured according to ASTM D5155. The oxyethylene content of the quasi-prepolymer is calculated from those of the starting materials. The 4,4'-content of the starting polyisocyanate(s) is calculated from those of the starting isocyanates. The resulting values are as reported in Table 1.

Polyol A is a 1000 molecular weight, nominally difunctional homopolymer of ethylene oxide. It contains 100% oxyethylene groups. Polyol A is commercially available as Carbowax™ 1000 polyol from The Dow Chemical Company.

Polyol B is a copolymer of ethylene oxide and propylene oxide having a nominal hydroxyl functionality of 2 and a number average molecular weight of approximately 2,400 g/mole. It contains 64% oxyethylene groups. Polyol B is commercially available as UCON™ PCL-270 polyol from The Dow Chemical Company.

Polyol C is a copolymer of ethylene oxide and propylene oxide having a nominal hydroxyl functionality of 3 and a number average molecular weight of approximately 5,000 g/mole. It contains 75% oxyethylene groups. Polyol C is commercially available as VORANOL™ CP-1421 polyol from The Dow Chemical Company.

Polyol D is a homopolymer of propylene oxide. It has a nominal hydroxyl functionality of 2 and a number average molecular weight of about 2000 g/mole.

Isocyanate A is a mixture of 98% 4,4'-MDI and 2% 2,4'-MDI. It has an isocyanate content of 33.5%. Isocyanate A is available from The Dow Chemical Company as ISONATE™ 125M polyisocyanate.

Isocyanate B is a mixture of 50% 4,4'-MDI and 50% 2,4'-MDI. It has an isocyanate content of 33.5%. Isocyanate B is available from The Dow Chemical Company as ISONATE™ 50 O,P polyisocyanate.

TABLE 1

| | Parts by Weight | | |
| --- | --- | --- | --- |
| | QP-A | QP-B | QP-C |
| Ingredient | | | |
| Polyol A | 52 | 0 | 0 |
| Polyol B | 13 | 7.2 | 0 |
| Polyol C | 0 | 65.1 | 0 |
| Polyol D | 0 | 0 | 68.9 |
| Isocyanate A | 21 | 16.6 | 12.4 |
| Isocyanate B | 14 | 11.1 | 18.7 |
| Properties | | | |
| NCO Content, % | 7 | 7 | 7 |
| Oxyethylene content | 62 | 48 | 0 |
| 4,4'-MDI isomer content | 80% | 80% | 69% |

B. Preparation of Polyurethane Foams

Polyurethane foams are made by separately reacting the foregoing quasi-prepolymers with an aqueous phase. The aqueous phase contains ingredients as set forth in Table 2. In each case, the various ingredients of the aqueous phase are first combined and the resulting aqueous phase is mixed with the quasi-prepolymer in a high-speed laboratory mixer at room temperature. The reaction mixture is poured into an open mold and allowed to rise and cure without application of heat.

The silicone surfactant is a silicone/ethylene oxide block copolymer containing about 70% by weight polymerized ethylene oxide. It is sold as Silwet® L-7605 by Momentive.

The ethylene oxide/propylene oxide block copolymer is a triblock copolymer having an internal polypropylene oxide) block of 1750 g/mol and which contains 80% by weight terminal poly(ethylene oxide) blocks. It has a nominal functionality of 2 hydroxyl groups per molecule.

The polymer polyol is a dispersion of 20% by weight styrene-acrylonitrile particles in a base polyol. The base polyol is a block copolymer of propylene oxide and ethylene oxide which has an average hydroxyl number of about 36, has a nominal functionality of 3 and contains 20% by weight oxyethylene units. The particle size is generally between 300 nm and 10 µm.

TABLE 2

| | Designation | | | | | | | |
|---|---|---|---|---|---|---|---|---|
| | Ex. 1 | Ex. 2 | A* | B* | C* | D* | E* | F* |
| | | | Aqueous Phase | | | | | |
| Ingredient | | | Parts by Weight | | | | | |
| Water | 25 | 25 | 49 | 26.5 | 26.5 | 27.4 | 12 | 25 |
| Silicone Surfactant | 1.5 | 1.5 | 1 | 1.5 | 0 | 1.5 | 1.5 | 1.5 |
| EO/PO Block Copolymer | 1.5 | 1.5 | 0 | 0 | 1.5 | 1.5 | 1.5 | 1.5 |
| Polymer Polyol | 9.5 | 9.5 | 0 | 9.5 | 9.5 | 7.1 | 22.5 | 9.5 |
| Total Aqueous Phase Weight | 37.5 | 37.5 | 50 | 37.5 | 37.5 | 37.5 | 37.5 | 37.5 |
| Prepolymer/Amount | A/62.5 | B/62.5 | A/50 | A/62.5 | A/62.5 | A/62.5 | A/62.5 | C/62.5 |
| Polymer Particles, % | 1.9 | 1.9 | 0 | 1.9 | 1.9 | 1.4 | 5.5 | 1.9 |

*Comparative

After curing, the foams are cured overnight under ambient conditions. The skins are removed and the foams are aged for 24 hours under ambient conditions before testing. The foams are evaluated for density and airflow according to ASTM D3574. Other specimens (except Comp. Sample A) are dried to constant weight, and compression set, moisture wicking, thermal conductivity and specific heat according to the test methods described above. Results are as indicated in Table 3.

TABLE 3

| | Property | | | | | |
|---|---|---|---|---|---|---|
| Sample Designation | Density, kg/m³ | Compression set, % | Moisture Wicking, s | Airflow, l/s | Thermal Conductivity, W/m-K | Specific Heat, J/g*° C. |
| 1 | 59.2 | 10 | 4 | 1.9 | 0.0409 | 2.01 |
| 2 | 73.6 | 34.3 | 4 | 0.76 | 0.0400 | 2.09 |
| A* | 108.8 | ND | ND | 0.61** | 0.0950** | 3.0** |
| B* | 75.2 | 47.4 | 4 | 1.22 | 0.0410 | 1.93 |
| C* | 104.0 | 85 | 4 | 0.71 | 0.0469 | 1.92 |
| D* | 86.4 | 88 | 4 | 0.61 | 0.0421 | 2.11 |
| E* | 61.6 | 83 | 4 | 2.7 | 0.0488 | 2.05 |
| F* | | | Does not form stable foam | | | |

*Comparative.
**Measured on undried foam samples.

Comparative Sample A corresponds to Example 1 of WO 2016/069537. This foam is made without the polymer polyol and using a silicone surfactant but not the ethylene oxide/propylene block copolymer. That foam has generally good properties but the density of about 109 kg/m³ is higher than is wanted.

Comparative Sample B shows the effect of introducing a copolymer polyol into an aqueous phase that contains a silicone surfactant but no ethylene oxide/propylene oxide block copolymer. These modifications permit density to be reduced to about 75 kg/³, but compression set is high at over 47%.

In Comparative Sample C, the silicone surfactant of Comparative Sample B is replaced with the ethylene oxide/propylene oxide block copolymer. Foam density, airflow and compression set all suffer significantly.

Example 2 is the same as Comparative Samples B and C, except the silicone surfactant and the ethylene oxide/propylene oxide block copolymer are both present in the aqueous phase. Density is decreased to below 60 kg/m³, and compression set is reduced dramatically, to 10%. At the same time, good moisture wicking is preserved and high airflows are achieved.

Example 1 demonstrates the effect of using a quasi-prepolymer having a somewhat lower oxyethylene content. Density is significantly lower than any of Comparative Samples A-C, and compression set is reduced substantially. Moisture wicking is preserved. Example 1 represents a significant improvement over Comparative Samples A-C.

Comparative Samples D and E show the effect of varying the amount of the polymer polyol. Too little polymer polyol (D) or too much polymer polyol (E) results in a dramatic and undesirable increase in compression set. Too little polymer polyol also leads to a substantial density increase.

Comparative Sample F demonstrates the need for the quasi-prepolymer to contain oxyethylene groups. Without the hydrophilic nature imparted by oxyethylene groups, the quasi-prepolymer is unable even to form a stable foam.

What is claimed is:

1. A flexible polyurethane foam comprising a reaction product of a reaction mixture that comprises
   a) an isocyanate-functional quasi-prepolymer, which isocyanate-functional quasi-prepolymer is a reaction product of at least one hydroxyl-terminated polymer of ethylene oxide with an excess of an organic polyisocyanate that includes at least 80 weight-% diphenylmethane diisocyanate of which diphenylmethane diisocyanate at least 50 weight-% is 4,4'-diphenylmethane diisocyanate, wherein the isocyanate-functional quasi-prepolymer has an isocyanate content of 5 to 15% by weight and contains 30 to 70 weight percent of oxyethylene units, based on the weight of the isocyanate-functional quasi-prepolymer,
   b) water,
   c) at least one polymer polyol comprising polymer particles dispersed in at least one base polyol,
   d) at least one silicone surfactant and
   e) at least one ethylene oxide/higher alkylene oxide block copolymer, wherein
   i) the quasi-prepolymer constitutes 50 to 75% of the combined weights of components a-e;
   ii) water constitutes 15-41% of the combined weights of components a-e;
   iii) the at least one polymer polyol constitutes 8 to 20% of the combined weights of components a-e and the polymer particles constitute 0.5 to 8% of the combined weights of components a-e;
   iv) the at least one silicone surfactant constitutes 0.5 to 3% of the combined weights of components a-e and
   v) the at least one ethylene oxide/higher alkylene oxide block copolymer constitutes 0.5 to 3% of the combined weights of components a-e.

2. The flexible polyurethane foam of claim 1 wherein the at least one polymer polyol constitutes 9 to 15% of the combined weights of components a-e and the polymer particles constitute 1.5 to 6% of the combined weights of components a-e.

3. The flexible polyurethane foam of claim 2 wherein the polymer particles are particles of a copolymer of styrene and acrylonitrile.

4. The flexible polyurethane foam of claim 1 wherein the reaction mixture contains no more than 5 parts per million by weight of metals and no more than 100 parts per million of amine compounds.

5. The flexible polyurethane foam of claim 1 wherein the silicone surfactant contains 25 to 70% by weight polysiloxane, 10 to 75% by weight polymerized ethylene oxide and 0 to 10% by weight polymerized propylene oxide, based on the weight of the silicone surfactant.

6. The flexible polyurethane foam of claim 1 wherein the ethylene oxide/higher alkylene oxide block copolymer contains 40 to 90% oxyethylene units and has a number average molecular weight of 1,500 to 12,000.

7. A method of making a flexible polyurethane foam, comprising
   A. forming a reaction mixture by mixing at least the following components a-e:
   a) an isocyanate-functional quasi-prepolymer, which isocyanate-functional quasi-prepolymer is a reaction product of at least one hydroxyl-terminated polymer of ethylene oxide with an excess of an organic polyisocyanate that includes at least 80 weight-% diphenylmethane diisocyanate of which diphenylmethane diisocyanate at least 50 weight-% is 4,4'-diphenylmethane diisocyanate, wherein the isocyanate-functional quasi-prepolymer has an isocyanate content of 5 to 15% by weight and contains 30 to 70 weight percent of oxyethylene units, based on the weight of the isocyanate-functional quasi-prepolymer,
   b) water,
   c) at least one polymer polyol comprising polymer particles dispersed in at least one base polyol,
   d) at least one silicone surfactant and
   e) at least one ethylene oxide/higher alkylene oxide block copolymer, and
   B. subjecting the reaction mixture formed in step A. to conditions at which the isocyanate-functional quasi-prepolymer and one or more of components b-e react to form the flexible polyurethane foam,
   wherein
   i) the quasi-prepolymer constitutes 50 to 75% of the combined weights of components a-e;
   ii) water constitutes 15-41% of the combined weights of components a-e;
   iii) the at least one polymer polyol constitutes 8 to 20% of the combined weights of components a-e and the polymer particles constitute 0.5 to 8% of the combined weights of components a-e;
   iv) the at least one silicone surfactant constitutes 0.5 to 3% of the combined weights of components a-e; and
   v) the at least one ethylene oxide/higher alkylene oxide block copolymer constitutes 0.5 to 3% of the combined weights of components a-e).

8. The method of claim 7 wherein the at least one polymer polyol constitutes 9 to 15% of the combined weights of components a-e and the polymer particles constitute 1.5 to 6% of the combined weights of components a-e.

9. The method of claim 8 wherein the polymer particles are particles of a copolymer of styrene and acrylonitrile.

10. The method of claim 7 wherein the reaction mixture contains no more than 5 parts per million by weight of metals and no more than 100 parts per million of amine compounds.

11. The method of claim 7 wherein the silicone surfactant contains 25 to 70% by weight polysiloxane, 10 to 75% by weight polymerized ethylene oxide and 0 to 10% by weight polymerized propylene oxide, based on the weight of the silicone surfactant.

12. The method of claim 7 wherein the ethylene oxide/higher alkylene oxide block copolymer contains 40 to 90% oxyethylene units and has a number average molecular weight of 1,500 to 12,000.

13. The method of claim 7 wherein after step B. the foam is dried to a constant weight.

14. A cushion comprising a flexible polyurethane foam of claim 1.

15. The cushion of claim 14, which is a pillow, mattress topper, mattress, comforter, furniture seat or back, automotive seat or back; quilt or article of insulated clothing.

16. The cushion of claim 14, wherein the flexible polyurethane foam, when dried to a constant weight, has a density of 48 to 80 kg/m$^3$ and a compression set of 40% or less.

17. The cushion of claim 14, wherein the flexible polyurethane foam, when dried to a constant weight, has a density of 48 to 64 kg/m$^3$ and a compression set of 15% or less.

18. The cushion of any of claim 14 wherein the flexible polyurethane foam, when dried to a constant weight, exhibits a specific heat of at least 1.5 J/g·° K, a thermal conductivity of at least 0.05 W/m·° K, a water uptake of 300% to 700% and a moisture wicking time of 5 seconds or less, preferably 4 seconds or less.

* * * * *